US009521828B2

(12) United States Patent
Brooks et al.

(10) Patent No.: US 9,521,828 B2
(45) Date of Patent: Dec. 20, 2016

(54) FEEDER FOR ANIMALS SELECTED FROM DOMESTIC PETS, CAGE BIRDS, CHICKENS, FISH AND WILD BIRDS

(71) Applicant: Pet Mate Ltd., Hersham, Surrey (GB)

(72) Inventors: Steve Brooks, Pyrford (GB); Jeremy Oates, London (GB)

(73) Assignee: Pet Mate Ltd., Hersham, Surrey (GB)

( * ) Notice: Subject to any disclaimer, the term of this patent is extended or adjusted under 35 U.S.C. 154(b) by 170 days.

(21) Appl. No.: 14/480,895

(22) Filed: Sep. 9, 2014

(65) Prior Publication Data

US 2015/0068462 A1    Mar. 12, 2015

(30) Foreign Application Priority Data

Sep. 10, 2013  (GB) .................................. 1316085.8

(51) Int. Cl.
  *A01K 5/02*   (2006.01)
  *A01K 61/02*  (2006.01)

(52) U.S. Cl.
  CPC ........... *A01K 5/0291* (2013.01); *A01K 5/0225* (2013.01); *A01K 5/0258* (2013.01); *A01K 5/0275* (2013.01); *A01K 61/02* (2013.01); *A01K 61/025* (2013.01)

(58) Field of Classification Search
  CPC ...... A01K 5/00; A01K 5/0114; A01K 5/0135; A01K 5/0142; A01K 5/02; A01K 5/0225; A01K 5/0258; A01K 5/0275; A01K 5/0291
  See application file for complete search history.

(56) References Cited

U.S. PATENT DOCUMENTS 2,940,639 A * 6/1960 Winter ................. A01K 5/0258
                                                    119/51.11
3,037,611 A * 6/1962 Majorowicz ......... A01K 5/0258
                                                    119/57.7
(Continued)

FOREIGN PATENT DOCUMENTS

EP    0514291 A2    11/1992
GB    1192789 A *   5/1970   ........... A01K 5/0275
(Continued)

OTHER PUBLICATIONS

Search Report in GB1316085.8 dated Sep. 25, 2013.
European Search Report in EP14250105.5 dated Feb. 23, 2015.
British Search Report in GB1416030.3 dated Feb. 20, 2015.

*Primary Examiner* — Monica Williams
*Assistant Examiner* — Michael A Fabula
(74) *Attorney, Agent, or Firm* — Manelli Selter PLLC; Edward J. Stemberger

(57) ABSTRACT

A feeder is provided for animals selected from domestic pets, cage birds, chickens, fish and wild birds. The feeder has a hopper to hold a supply of dry feed. A chamber receives feed by gravity from a lower portion of the hopper, and has a discharge outlet at one axial end of the chamber. A passage is defined from and includes the chamber and extends to an opening at the distal end of the discharge outlet for discharge of feed from the feeder. An auger is mounted for rotation about an axis within the chamber. The auger is adapted as it rotates to move feed along the passage to be discharged at the distal end of the discharge outlet. A shutter is adapted to occlude the passage and is provided within the discharge outlet. The shutter is coupled to and rotates with the auger.

12 Claims, 8 Drawing Sheets

(56) References Cited

U.S. PATENT DOCUMENTS

| | | | | |
|---|---|---|---|---|
| 3,303,917 A * | 2/1967 | Wilkes | A01K 5/0258 198/550.1 |
| 3,710,983 A * | 1/1973 | Ricciardi | B01F 7/00408 222/141 |
| 3,756,372 A * | 9/1973 | Mertens | G21F 9/008 198/495 |
| 3,962,997 A * | 6/1976 | Ruth | A01K 5/0283 119/51.11 |
| 4,361,117 A * | 11/1982 | Tohme | F04B 7/0053 119/57.6 |
| 4,665,862 A * | 5/1987 | Pitchford, Jr. | A01K 5/0291 119/51.11 |
| 4,699,265 A * | 10/1987 | Houle | B65G 33/34 198/550.1 |
| 4,735,171 A * | 4/1988 | Essex | A01K 5/0291 119/51.12 |
| 4,949,674 A * | 8/1990 | Young | A01K 61/025 119/51.04 |
| 5,154,547 A * | 10/1992 | Young | A01K 61/02 119/51.04 |
| 5,222,634 A * | 6/1993 | Hayes | A47G 19/34 222/185.1 |
| 5,299,529 A * | 4/1994 | Ramirez | A01K 5/0291 119/51.11 |
| 5,315,958 A * | 5/1994 | Forster | A01K 11/006 119/54 |
| 5,328,015 A * | 7/1994 | Volk, Jr. | B65G 65/46 198/548 |
| 5,363,805 A * | 11/1994 | Wing | A01K 5/0291 119/51.11 |
| 5,381,967 A * | 1/1995 | King | B65G 65/44 222/161 |
| 5,480,061 A * | 1/1996 | Ellinger | G07F 11/24 198/548 |
| 6,135,056 A * | 10/2000 | Kuo | A01K 5/0291 119/51.11 |
| 6,401,657 B1 * | 6/2002 | Krishnamurthy | A01K 5/0291 119/51.11 |
| 6,540,102 B2 * | 4/2003 | Gates | G07F 11/60 221/197 |
| 7,905,200 B1 * | 3/2011 | Gaston | A01K 5/0291 119/51.11 |
| 9,295,226 B2 * | 3/2016 | Brooks | A01K 5/0291 |
| 2005/0217591 A1 * | 10/2005 | Turner | A01K 5/0114 119/51.02 |
| 2009/0255474 A1 * | 10/2009 | Gleesing | A01K 61/025 119/51.04 |
| 2010/0269757 A1 * | 10/2010 | Park | A01K 5/0291 119/54 |
| 2011/0174224 A1 * | 7/2011 | Brooks | A01K 5/0275 119/57.92 |
| 2013/0333622 A1 * | 12/2013 | Jin | A01K 5/0291 119/51.01 |
| 2014/0224179 A1 * | 8/2014 | Mignone | A01K 61/02 119/51.04 |
| 2015/0090186 A1 * | 4/2015 | Massicotte | A01K 5/0275 119/51.11 |

FOREIGN PATENT DOCUMENTS

| | | |
|---|---|---|
| GB | 2356190 A | 5/2001 |
| GB | 2476996 A | 7/2011 |
| WO | 9921783 A1 | 5/1999 |
| WO | 2012023124 A2 | 2/2012 |

\* cited by examiner

FEEDER FOR ANIMALS SELECTED FROM DOMESTIC PETS, CAGE BIRDS, CHICKENS, FISH AND WILD BIRDS

BACKGROUND

This disclosure relates to feeders, namely apparatus for feeding animals selected from domestic pets, fish, chickens and wild birds.

Pet feeders which provide one or more meals for a pet at selected times, have proved popular with pet owners as they allow the owner to feed their pet at times when it may not be possible for the owner to be home to feed them directly. The quantity of food supplied is chosen by the pet owner. A pet feeder specifically designed for dispensing dry feed to pets, cage birds, fish or wild birds over an extended interval and in metered amounts is described in British Patent No: 2476996 Pet Mate Ltd.

While this pet feeder has proven successful, problems sometimes occur. When the feeder is used for intelligent pets such as cats and dogs these animals may learn that if they nudge the feeder or discharge outlet more feed may sometimes fall through the discharge opening. If the pellets are small enough, more food may fall through the discharge outlet with each nudge until the feeder is empty. Additionally feed in the discharge outlet is exposed to the air and so may become damp. This, in turn, may lead to the feed clogging the discharge outlet. This is a particular problem when the feeder is used to feed fish.

We have found that providing a simple shutter that slides into place to cover the discharge outlet leads to further problems wherein food pellets may get caught in the shutter mechanism and may prevent the shutter from closing properly or prevent the feeder from working correctly. If the shutter becomes jammed the feeder may become damaged. In addition to damaging the feeder, Applicant has found that intelligent animals may still be able to extract feed from the discharge outlet.

EP0514291 Rena France discloses a feeder for aquatic life that fits on to an aquarium edge, which feeder adopts a different approach, but still does not solve the problems. A screw auger is mounted in a v-shaped trough beneath and open to a hopper proper to transport fish food from the trough through a cylindrical passage with radius just larger than the auger into a generally cylindrical discharge chamber, the radius of which is larger than that of the passage. From the discharge chamber the feed drops into the aquarium through an opening which is opened in the course of each rotation of the auger by a cylindrical shutter fixed to the shaft of the auger and surrounding the discharge chamber externally. With this configuration, because the cross-section of the cylindrical passage is substantially less than that of the v-shaped trough, there will be a tendency for feed to clog at the entrance to the passage. Also, the leading edge of the shutter will tend to carry feed present in the discharge opening into the gap between the shutter and the outer wall of the discharge chamber as the shutter rotates, causing the shutter to jam. Any feed retained between the shutter and the discharge chamber may spoil.

SUMMARY OF THE DISCLOSURE

The current disclosure arises from our work seeking to overcome the aforesaid problems.

In accordance with the present disclosure, a feeder comprises: a hopper adapted to hold a supply of dry feed; a chamber adapted to receive feed by gravity from a lower portion of the hopper, and having a discharge outlet at one axial end of the chamber, a passage being defined from and including the chamber to an opening at the distal end of the discharge outlet for discharge of feed from the feeder; an auger mounted for rotation about an axis within said chamber, the auger being adapted as it rotates to move feed along said passage to be discharged at the distal end of the discharge outlet; a shutter adapted to occlude the passage and being provided within the discharge outlet, the shutter being coupled to and rotating with the auger; the shutter having a forward edge and a trailing edge defined in relation to the direction of rotation; the discharge outlet being provided with an enlarged end portion; the enlarged end portion having an outer wall spaced from the passage such that as the forward edge progressively occludes the passage as the shutter rotates, any feed between the outer wall and the forward edge of the shutter will simply fall from the enlarged end portion; an electric motor; a drive system for coupling the motor to the auger to provide drive thereto, the drive system being adapted in use to cause the electric motor to rotate the auger through a discrete number of completed 360° turns such that when the auger is not rotating the passage is fully occluded by the shutter.

The term auger is used herein to refer to a mechanism that is mounted for rotation about its axis within a chamber, and, in so doing, to cause particulate material within the chamber to be carried by the auger in an axial direction. Examples of augers include a screw conveyor, in which the auger has a form similar to that of a simple corkscrew, and a helical wire.

Preferred embodiments of our feeder have one or more of the following features: the passage is generally cylindrical. The chamber defines an interior wall, and the passage has essentially the same radius throughout being the radius of the interior wall of the chamber. The shutter comprises a generally cylindrical wall cut away on one side, the interior surface of the cylindrical wall defining part of the passage. The generally cylindrical wall is positioned so that, as the shutter rotates with the auger, feed from the chamber may pass axially from the chamber to the interior of the shutter to discharge from the feeder through the cut away or alternatively the passage is occluded by the cylindrical wall. A fixed connecting member with a generally cylindrical inner surface is coupled to the chamber, and defines that portion of the passage immediately upstream of the generally cylindrical wall of the shutter. The discharge outlet is provided with a depending wall on one side of the opening therefrom such that, when the passage is fully occluded, the trailing edge is adjacent the depending wall, and the depending wall cooperates with the shutter to prevent discharge of feed over the trailing edge of the shutter when the auger is not rotating and the forward edge is at a height above the trailing edge. The forward edge is provided with a lip, discharge of feed from the passage being progressively restricted as the passage is occluded by the leading edge of the shutter up to a position before the passage is fully occluded at which further discharge is prevented by the lip. The discharge outlet and the shutter are provided with a resistance mechanism to resist the shutter rotating when the passage is fully occluded by the shutter. The resistance mechanism comprises a lug provided on the discharge outlet which acts on a projection provided on the shutter. The enlarged end portion of the discharge outlet restricts access to the interior of the passage from outside the feeder.

BRIEF DESCRIPTION OF THE DRAWINGS

Embodiments of feeder in accordance with the present teachings are described hereinbelow by way of example only with reference to the accompanying drawings, in which.

DESCRIPTION OF PREFERRED EMBODIMENTS

Figure 1:
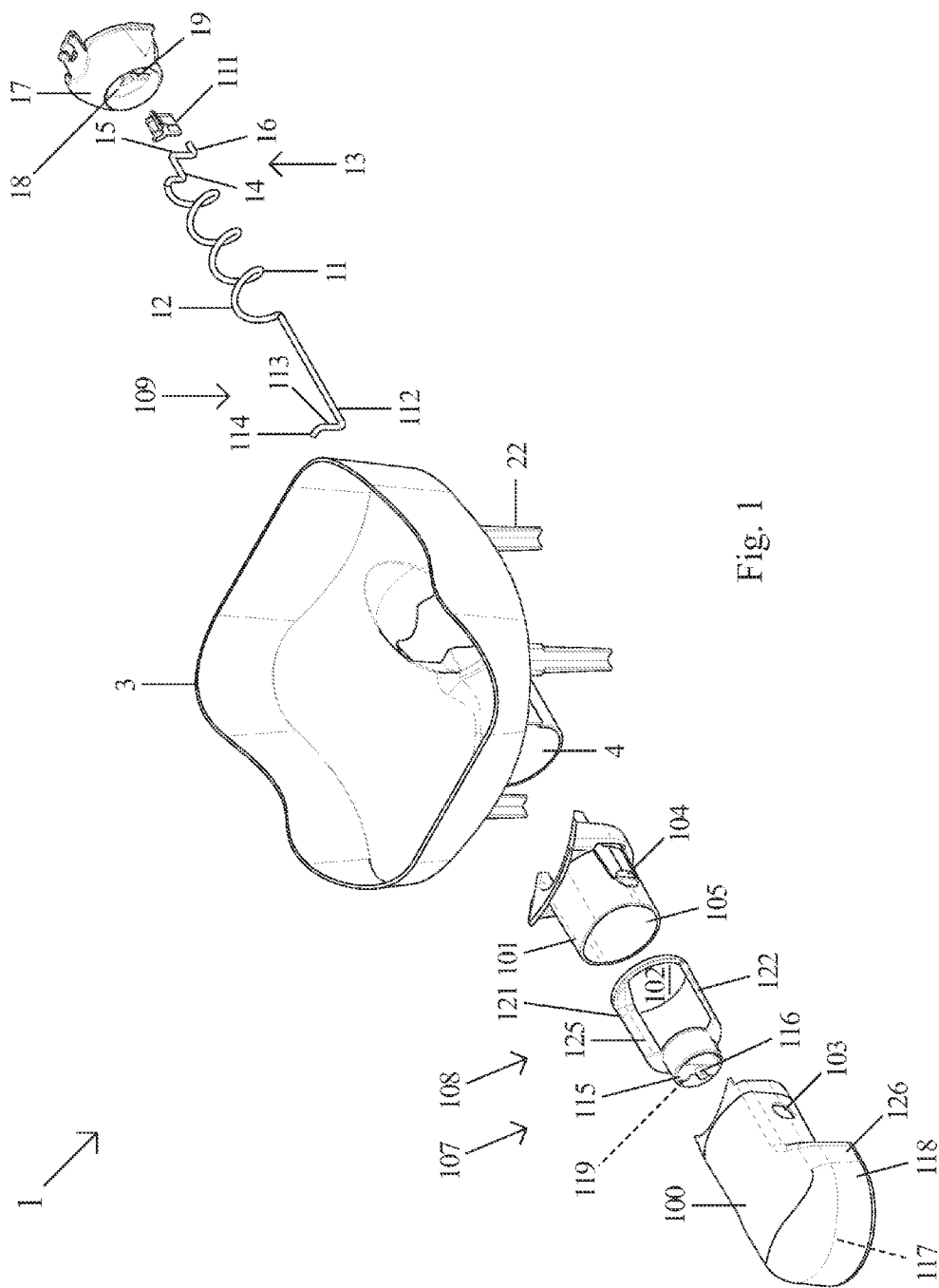
FIG. 1 is an exploded view from above of a hopper unit of a pet feeder, with the upper portion of the hopper proper cut away to show the internal structure.
Figure 2:
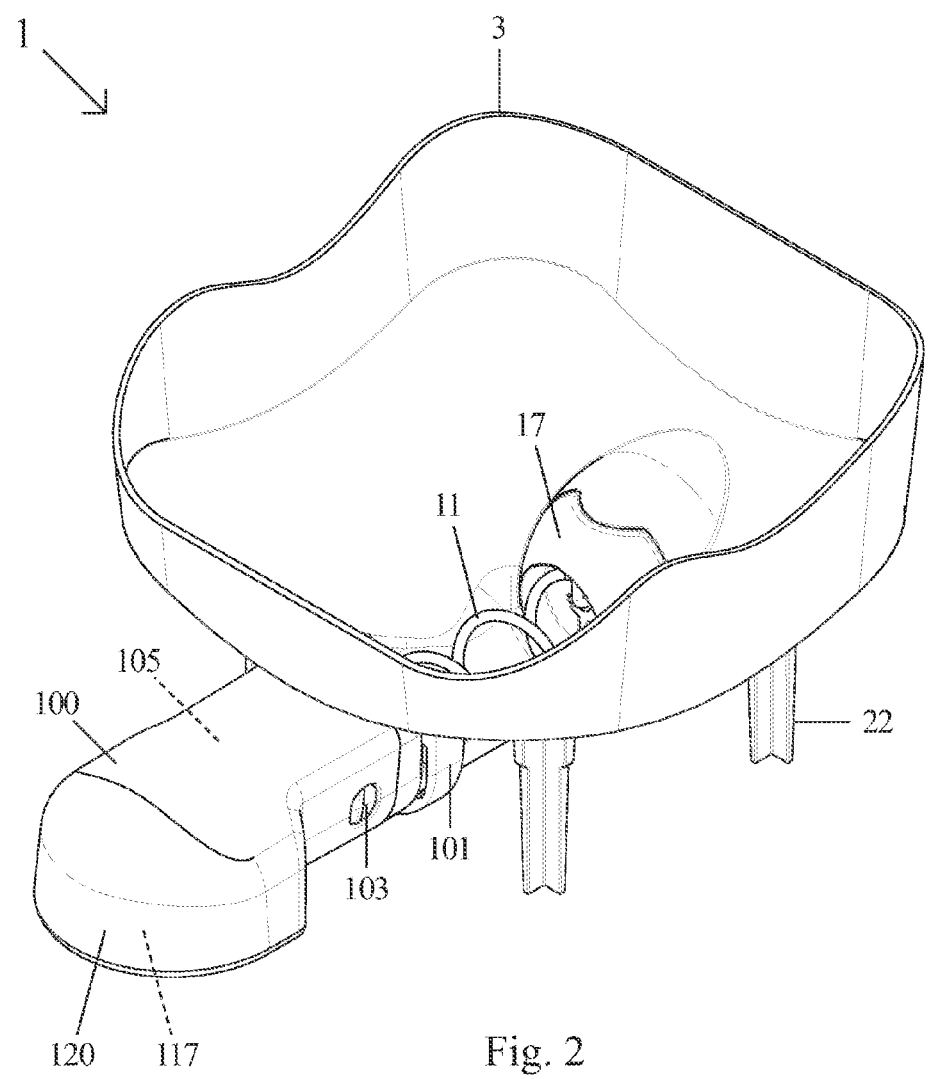
FIG. 2 is a perspective view from above of the hopper unit of FIG. 1.
Figure 3:
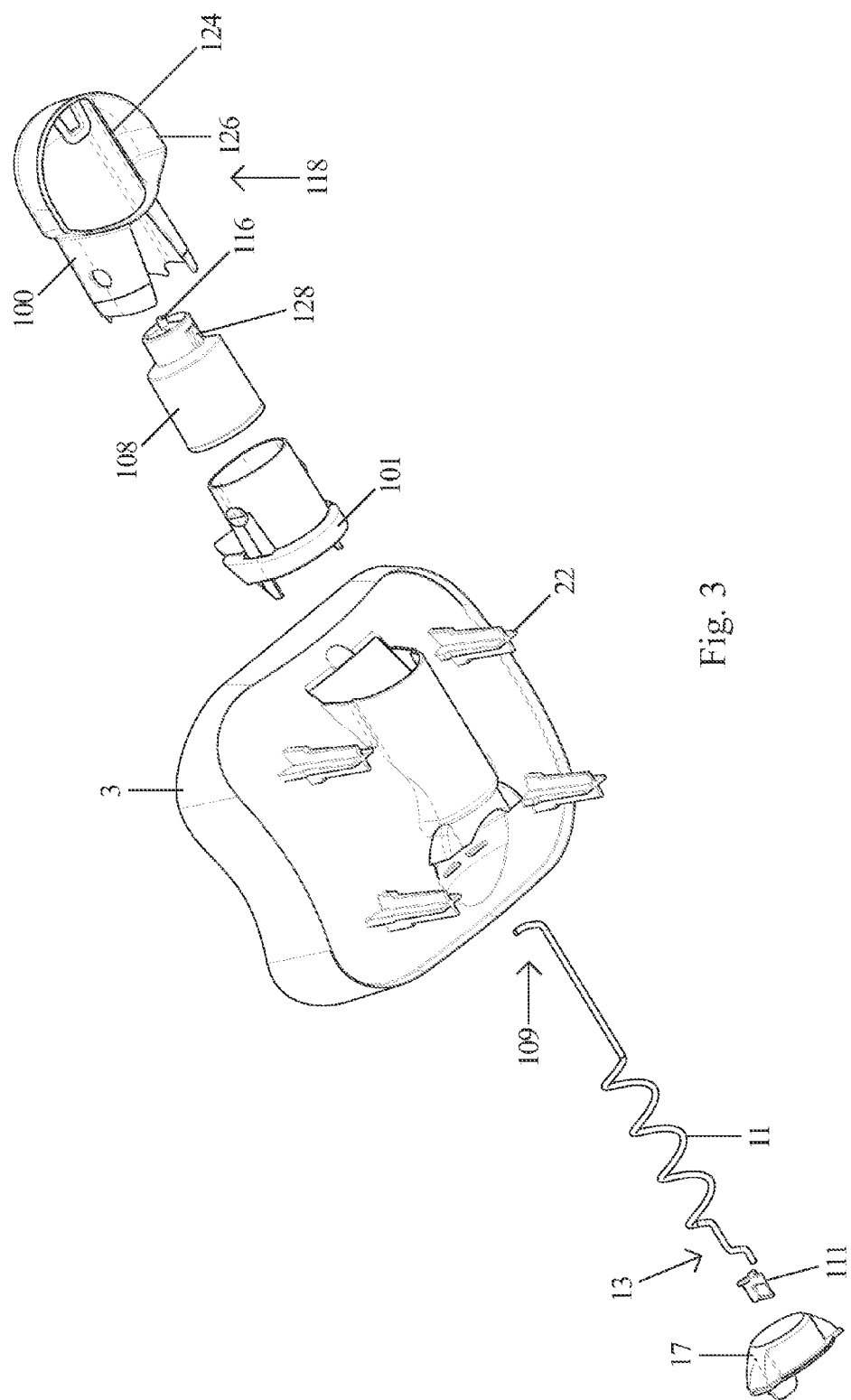
FIG. 3 is an exploded view from below of the hopper unit of FIGS. 1 and 2.
Figure 4:
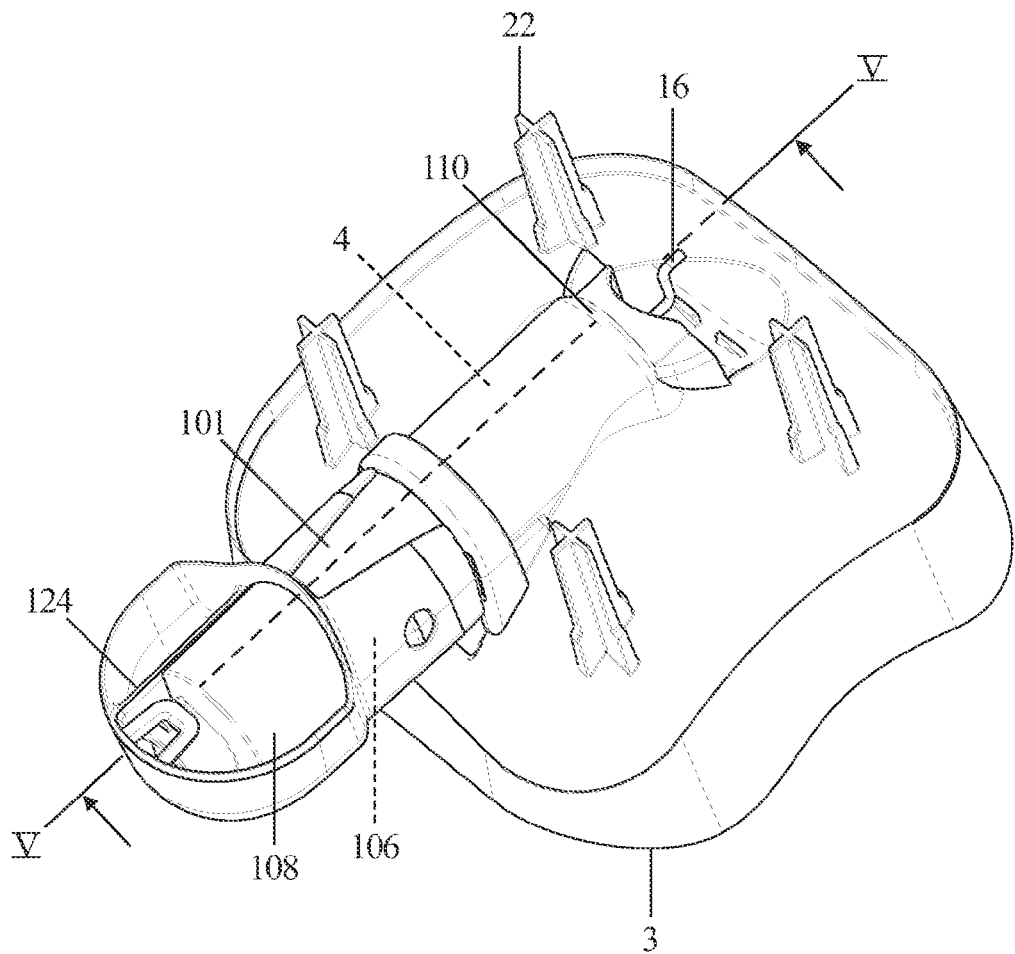
FIG. 4 is a perspective view from below of the hopper unit of FIGS. 1 to 3.

The presently described embodiment of feeder may be seen as an improvement or modification of the feeder described in GB2476996. Many of the component parts are the same. For the convenience of readers who may wish to compare the embodiment described in GB2476996 with that described below, where feasible, the same reference numerals are employed in the accompanying drawings for parts disclosed in GB2476996.

Figure 5:
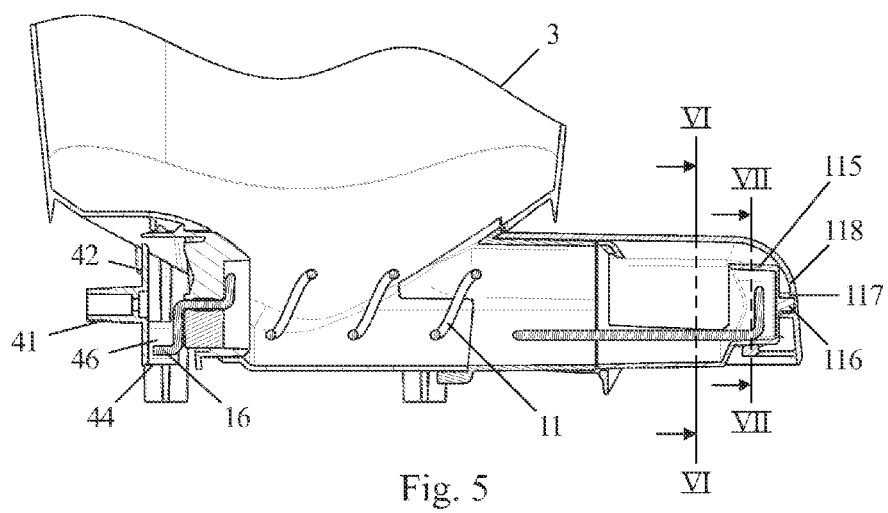
FIG. 5 is a cross-sectional view of the hopper unit of FIGS. 1 to 4 taken along the line V-V in FIG. 4.

The embodiment of pet feeder illustrated in the drawings is provided as two main components, namely a hopper unit 1, shown in FIGS. 1 to 4, and a base unit 2, shown in exploded view in FIG. 5, the hopper unit being freely separable from the base unit. When separated, the individual units may readily be cleaned and the hopper unit refilled with a fresh supply of feed when empty. Both units are readily portable in the illustrated embodiment.

The hopper unit comprises a hopper proper 3 from which dry petfood feeds by gravity into a chamber 4 beneath the hopper proper. An animal proof lid, not illustrated, may be provided to cover the hopper proper 3.

As explained in more detail below, the chamber 4 is provided with a mechanism adapted to receive feed from a lower portion of the hopper 3. A discharge outlet 100 is coupled to chamber 4 by a connecting portion 101 at one axial end of the chamber 4, the discharge outlet 100 being pushed over the external surface of the connecting portion 101 until through apertures 103 in the discharge outlet engage with projections 104 on the exterior of the connecting portion. A passage 105 is defined between and including chamber 4 and an opening 106 at the distal end of the discharge outlet 100 for discharge of feed from the feeder. The passage 105 has essentially the same radius throughout, this radius being essentially the same as the radius of the inner surface of chamber 4. The passage 105 is defined by the internal surface of connecting portion 101 and by a member having a cylindrical wall 107 which is partly cut away for a purpose to be explained and is mounted within discharge outlet 100. As explained below, this member serves as a shutter 108 to occlude the passage 105 at the opening 106 from the discharge outlet. Save for shutter 108, the passage 105 is open at the distal end of the discharge outlet 100 for discharging feed in metered amounts into a feeding receptacle 10 (FIG. 5) accessible to a pet.

An auger 11, here provided in the form of a helical wire 12, has a drive engaging portion 13 at its proximal end and a shutter engaging portion 109 at its distal end, and is mounted in the passage 105. Drive engaging portion 13 comprises a portion 14 of wire that extends along the axis of the helix, a short portion 15 of wire that extends radially of that axis and a terminating portion 16 extending parallel to axial portion 14. The auger is mounted in a fitting 17 that plugs proximal end 110 of passage 105 so that axial portion 14 is received in a central through bore 18 of fitting 17, and radial portion 15 and terminating portion 16 pass through a slot 19 in the fitting 17, slot 19 being subsequently plugged with plug 111, to lie outside chamber 4 for engagement with a drive mechanism as explained in more detail below. Thus the auger 11 is mounted in through bore 18 for rotation about the axis of the auger, which will cause feed within the chamber to be moved by the auger axially along the passage 105 towards opening 106 at the distal end thereof opposite fitting 17.

The shutter engaging portion 109 comprises a portion 112 of wire that extends along the axis of the helix, a short portion 113 that extends radially of that axis and a terminating portion 114 extending perpendicular to both the axis of the helix and the short portion 113. As noted above, shutter 108 is formed with a generally cylindrical wall 107 which has a radius that is equal to the radius of connecting portion 101, and rotates within discharge outlet 100. Thus, feed passing along the passage from chamber 4 to the opening 106 will encounter no steps or change in radius of the surfaces defining the passage as it travels therealong. This helps to avoid blockages occurring due to feed getting slowed or trapped by a change of surface. As noted above, shutter 108 has a cut-out on one side, identified by reference numeral 102. The shutter 108 has a closed end 115 provided with a spindle 116 on its outer side rotatively received within a blind socket 117 on the interior of an enlarged end portion 118 of discharge outlet 100. The inner side of the closed end 115 is provided with a well 119 complementary in shape to the short portion 113 and terminating portion 114 of shutter engaging portion 109. In use the shutter 108 will be located at distal end 120 of passage 105 with its spindle 116 received within the blind socket 117 and the shutter engaging portion 109 of auger 11 received within the well 119 of shutter 108 so that the shutter 108 rotates with the auger 11.

The shutter 108 has a forward edge 121 and a trailing edge 122 which define the cut-out 102. Discharge outlet 100 has an enlarged end portion 118 within which shutter 108 rotates. This enlarged end portion 118 restricts access to the passage 105 and shutter 108 from outside the feeder. Pets are prevented from reaching the feed within passage 105 with their paws. The enlarged end portion 118 is provided with an internal depending wall 124. The depending wall 124 is positioned where the trailing edge 122 of the shutter 108 comes to a halt when shutter 108 fully occludes the passage 105, thereby preventing the discharge of feed over the trailing edge 122. When the shutter 108 fully occludes the passage 105, the forward edge 121 is at a height above the trailing edge 122. From the point where the passage 105 is fully open to the point where the passage 105 is fully occluded the rotation of the shutter 108 will progressively restrict discharge of feed until the discharge is stopped completely. This will occur before the passage 105 is fully occluded and will help to prevent feed pellets becoming caught between the shutter 108 and the discharge outlet 100.

Additionally, the forward edge 121 of the shutter 108 is provided with a lip 125. The lip 125 further progressively restricts discharge of feed from the passage from the point in the rotation where the lip 125 is adjacent to the depending wall 124 until the discharge is stopped completely. This will occur before the passage 105 is fully occluded and before discharge would stop if there were no lip to retain feed within the shutter 108, will help to prevent feed pellets becoming caught between the shutter 108 and the discharge outlet 100.

Enlarged end portion 118 of discharge outlet 100 is defined by an outer wall 126 spaced a predetermined distance from the passage 105. Any feed between the outer wall 126 and the shutter 108 will simply fall from the enlarged end portion 118 and so cannot cause a blockage.

The base of hopper unit 1 is provided with four depending legs 22 adapted to be located in wells 23 in an upper surface 24 of base unit 2 which is curved to correspond to the configuration of the bottom of the hopper. Base unit 2 is also provided with a well 25 configured to accommodate the chamber 4. Wall 26 defines one axial end of well 25, the other axial end 27 of well 25 being open to allow the passage 101 to extend therethrough. Base unit 2 comprises a body 28 and a floor 29 to define with the body a hollow housing for accommodating components of a drive and control system. Batteries for driving an electric motor 30 are mounted within a battery housing 31 defined by floor 29 and a latchable closure, not shown, on the underside of floor 29. Motor 30 is supported by a ledge 32 integral with an auxiliary drive housing 33 which fits to the underside of body 28 so that a geared drive wheel 34 is located in the space defined between wall 26 and an outer surface 35 of the body. Drive wheel 34 is rotated by a worm drive 36 turned by a cog 37 at one axial end that is rotated in turn by a worm 38 mounted on shaft 39 of motor 30. A centre fitting 40 of drive wheel 34 receives an axial projection 41 of a wheel 42 mounted against wall 26 so that projection 41 passes through an opening 43 in wall 26.

Figure 6:
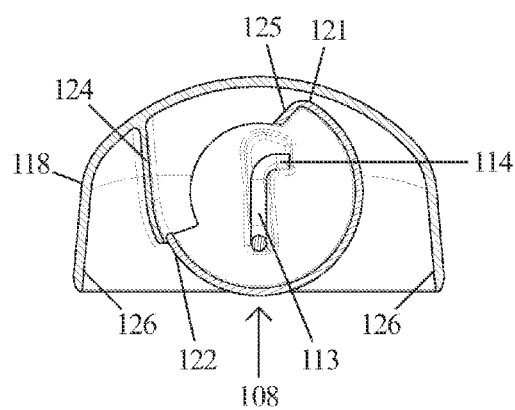
FIG. 6 is an enlarged cross-sectional view of the hopper unit of FIGS. 1 to 5 taken along the line VI-VI in FIG. 5, and showing a shutter within a discharge outlet of the hopper unit.

Wheel 42 is provided with an indexing mechanism adapted to index individual turns of the auger, as a result of which the feeder is adapted to supply feed at the distal end of the passage 105 in metered amounts. The motor 30 is adapted to rotate the auger 11 a discrete number of completed 360° turns such that when the auger 11 is not rotating the passage 105 is fully occluded by the shutter 108. The indexing mechanism includes a switch adapted to be operated a set number of times (in this embodiment, just once) in each revolution of wheel 42, and hence of the auger 11. In this embodiment, wheel 42 mounts an eccentric lug 44 which mounts a magnet 45. One or other of two side walls 46 of lug 44 are adapted to engage terminating portion 16 of auger 11 depending on the direction of rotation of motor 30. As the wheel rotates, once in each rotation, its magnet 45 comes into confronting relation with a reed switch 47 supported by brackets 48 projecting from auxiliary drive housing 33 so that the reed switch 47 is located in the space between body 28 and floor 29 just beneath a flat 49 defined at the base of wall 26. Reed switch 47 is included in a control circuit (FIG. 6) to provide a digital pulse position input to a central processing unit 51. It will readily be appreciated by persons skilled in this field that other forms of switch actuated by rotation of the auger or of drive mechanism therefor may be similarly employed to provide a signal to a control circuit for the battery driven motor.

Central processing unit 51 is coupled to a drive 52 for a LCD display 53 visible in a control panel 54 on the exterior of base unit 2. Central processing unit 51 is also coupled to a clock timer 55 and to an input 56 controlled by push buttons 57 included in control panel 54. A low battery detection and warning system 58 is coupled to the central processing unit 51 and to the batteries 59 themselves. The warning may be visible and/or audible and may appear on LCD display 53. A motor control 60 is coupled to drive the motor 30 in accordance with the programming of central processing unit 51.

The use of an indexing mechanism that indexes individual turns provides an accurate measure of when a full 360° turn has been completed. The feeder may employ an inexpensive battery driven motor. Such motors exhibit significant variability. If the auger 11 was simply set to rotate for a predetermined period of time at each feed, the amount the auger 11 rotated would depend upon the particular motor and also upon the battery voltage and the state of the battery at the time this would result in the auger 11 stopping rotating while the passage 105 was still open allowing the pet access to extra feed.

The enlarged end portion 118 of the discharge outlet 100 restricts access to the shutter 108. This has the twin benefits of making it harder for a pet to move the shutter 108 and of preventing a pet from getting its paw trapped and a user of getting their finger trapped in the mechanism while it is rotating.

However, the enlarged end portion 118 alone may not be enough to stop a pet from seeking to move the shutter 108 from beneath in the hope of gaining access to more feed. Resistance provided by the motor 30 inhibits movement of the shutter 108 in the reverse direction. To inhibit movement in the forward direction the discharge outlet 100 is provided with a lug 127 and the shutter 108 is provided with a projection 128. When the auger 11 is not rotating and the passage 105 is fully occluded the lug 127 will lie adjacent the projection 128. Continued rotation of the shutter must overcome force resisting movement of the projection 128 past the lug 127. This force is sufficient to prevent a pet from rotating the shutter 108 forwardly but small enough that it may be overcome by the torque provided by motor 30.

Receptacle 10 is formed as a shallow bowl 61 with a sloping wall 62 to guide dry petfood discharged from opening 106 into the bottom of the bowl. Angled projections 63 at the rear of receptacle 10 are a push fit into recesses 64 in floor 29. Receptacle 10 is not always required. Thus it is useful when the feeder is employed to feed cats, dogs, cage birds, rabbits or rodents. However, when the feeder is used to feed fish the passage 105 may be extended by employing a longer connecting portion 101 and longer auger 11 and simply discharge on to the surface of water within an aquarium or fish bowl. For chickens, the receptacle may or may not be used. Scratching and pecking for food on the ground is a natural habit for chickens, so that, while use of a receptacle may be tidier, discharge on to the ground may provide a more natural experience for the chickens. When the feeder is used to feed wild birds, in order to make it less readily accessible to squirrels, it may be set upon a pole or alternatively hung from above, and in some arrangements may dispense with a receptacle and simply discharge bird feed on to the ground beneath the feeder.

The feeder may be programmed in two different ways, depending upon the needs of the animals concerned.

In Standard Feed, meal times are set by the user employing buttons 57. When a set mealtime is reached, the motor 30 is controlled to rotate a preset number of times, as detected by the magnet and reed switch, to serve a metered quantity of feed by rotating the auger 11 by that number of complete 360° turns to discharge the corresponding amount of feed from the passage 105 into receptacle 10.

In Frequent Feed, meal times are set by a start time and an end time, and the quantity of feed to be fed between those times is also set. The motor is then rotated through one full turn of the auger as detected by the magnet and reed switch at equal intervals between the start time and end time. For example, if the start time is set at 8:00 am and the end time is set at 9:00 am and the quantity of feed is set at 7 turns of the auger, one turn will occur at each of 8:00 am, 8:10 am, 8:20 am, 8:30 am, 8:40 am, 8:50 am and 9:00 am.

Dogs generally prefer to eat all that is available at one go, so that Standard Feed may be more suitable for dogs, while some cats prefer to graze over a period, and for them the frequent Feed option may be preferred. Frequent feed is particularly suitable for feeding a diabetic dog or cat, as this prevents gorging, and is also suitable for surface feeding fish.

Figure 7:
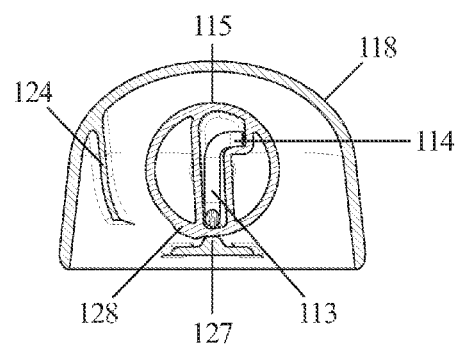
FIG. 7 is an enlarged cross-sectional view of a the hopper unit of FIGS. 1 to 6 taken along the line VII-VII in FIG. 5.
Figure 8:
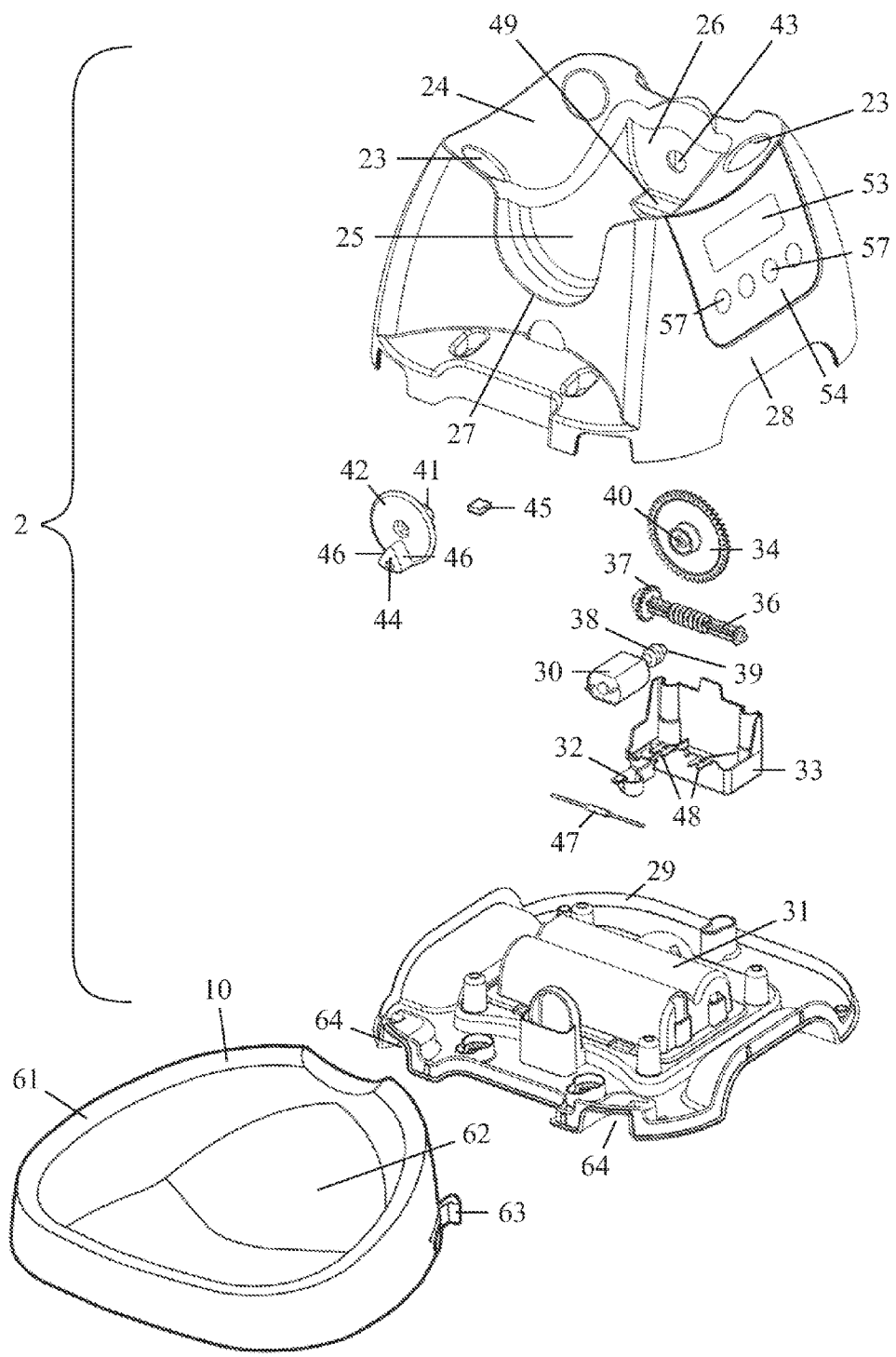
FIG. 8 is an exploded view of a base unit for cooperation with the hopper unit of FIGS. 1 to 7.
Figure 9:
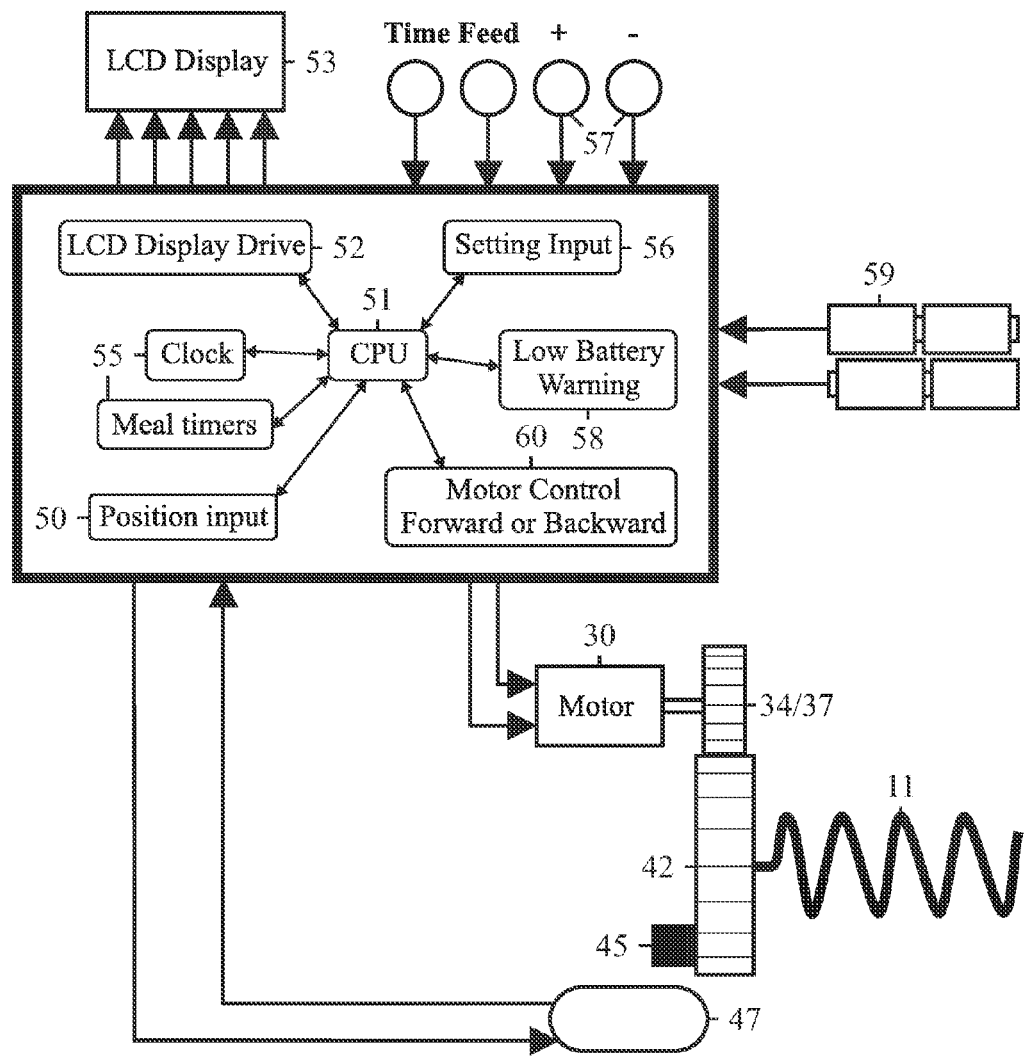
FIG. 9 is a generally schematic partly diagrammatic view of a drive and control system for the pet feeder of FIGS. 1 to 8.
Figure 10:
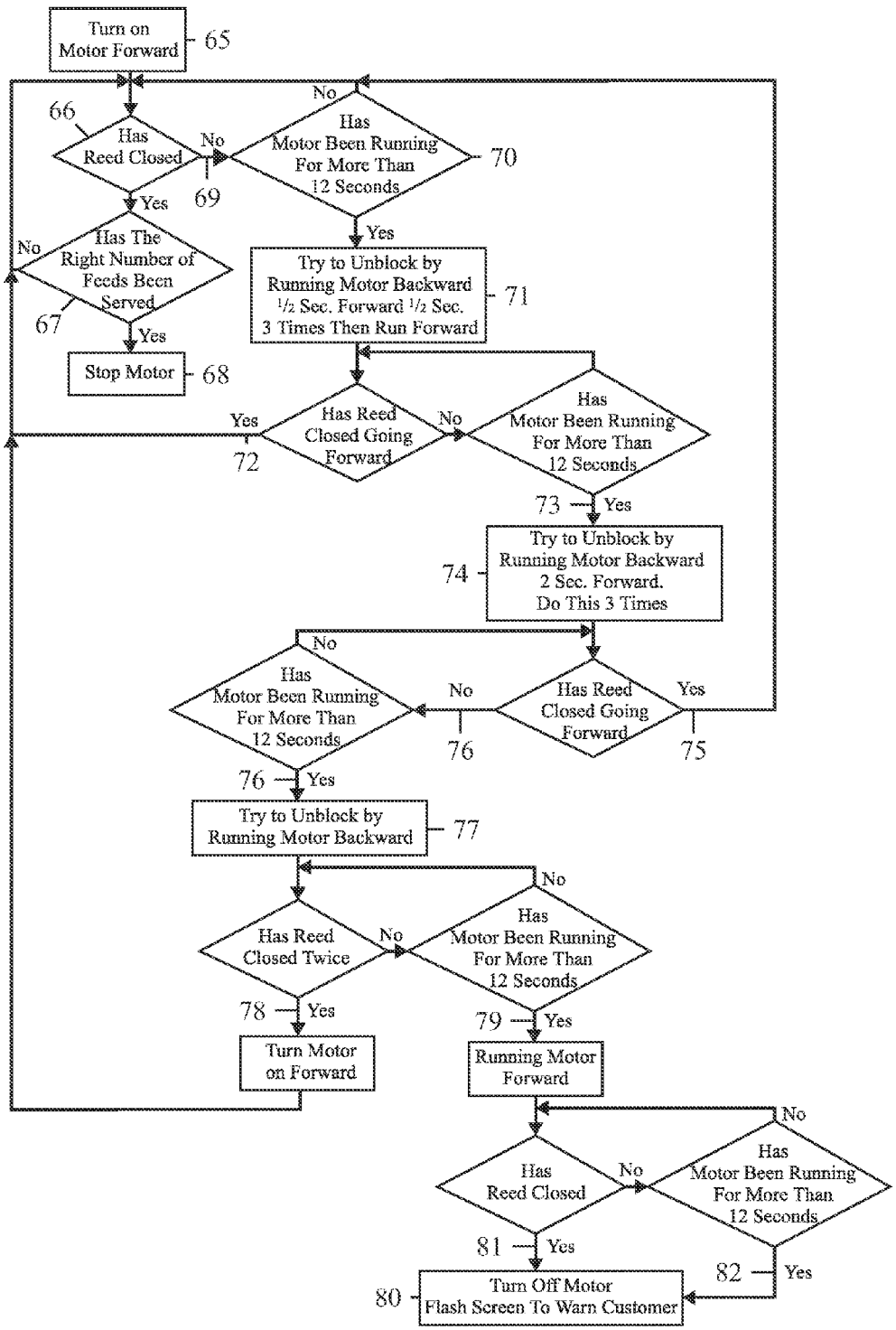
FIG. 10 is a logic flow diagram explaining how the drive and control system of FIG. 9 may be controlled to detect and seek to unblock a blockage in the feed.

The helical wire 12 is preferred for auger 11 for two reasons. It is relatively inexpensive. Also, as compared with other more solid augers, there is less risk of the feed causing a blockage. However, the system can readily be programmed to detect a blockage and to try to relieve it, as explained by reference to FIG. 7. Whether Standard or Frequent Feed is selected, when the motor 30 is first turned on to cause feed to move in the forward direction towards the distal end 120 of passage 105 (Step 65), the system checks at Step 66 whether the reed switch 47 closes. If it does, the system checks (Step 67) whether the required number of complete turns has been reached. If it has, the motor is stopped (Step 68); but if it has not, the motor 30 is further rotated until the reed switch 47 closes again (Step 66 repeated). If a reed switch 47 check detects no closure (Step 69) and a check shows that the motor 30 has been running for more than 12 seconds (Step 70), a first attempt is made in Step 71 to relieve the blockage by running the motor 30 three times backwards for half a second and forward for half a second before resuming normal forward rotation. If the reed switch 47 then closes on the forward turn (Step 72) all is well and the system returns to normal drive. However if the reed switch 47 has still not closed after a further 12 seconds (Step 73), a second attempt is made in Step 74 to relieve the blockage by running the motor 30 three times backwards for 2 seconds and forward for two seconds before resuming normal forward rotation. If the reed switch 47 then closes on the forward turn (Step 75) all is well and the system returns to normal drive. However if the reed switch 47 has still not closed after a further 12 seconds (Step 76), a third attempt is made in Step 77 to relieve the blockage by running the motor 30 backwards. If the reed switch 47 closes twice in this backward rotation of the auger (Step 78), this suggests that the problem may have been relieved and the system returns to normal drive. However, if the reed switch 47 has not closed twice within 12 seconds of reverse rotation (Step 79), this suggests that there may be a blockage in the reverse direction as well as forwardly. Before turning the motor 30 off (Step 80), an attempt is made to turn the motor 30 forwardly until the reed switch 47 closes (Step 81), because this position allows easy disengagement of the hopper unit from the base unit, which will be necessary to allow a user to manually relieve the blockage, but if the red switch 47 has still not closed after a further 12 seconds (Step 82), the motor 30 is turned off in Step 80 regardless. When the motor 30 is turned off in Step 80, a warning is also generated visually on the LCD display 53 and/or audibly.

The invention claimed is:

1. A feeder for animals selected from domestic pets, cage birds, chickens, fish and wild birds, the feeder comprising:
   a hopper constructed and arranged to hold a supply of dry feed, the hopper having a lower portion;
   a chamber extending beneath the lower portion of the hopper to receive feed vertically by gravity from the lower portion of the hopper, the chamber defining an axis, and having an axial end;
   a discharge outlet coupled to the axial end of the chamber to receive feed therefrom, and having an opening at a distal end of the discharge outlet for discharge of feed from the feeder, the distal end of the discharge outlet having an enlarged end portion;
   a passage being defined from and including the chamber and to the discharge outlet and terminating at said opening, and
   an auger mounted for rotation about the axis within said chamber, the auger being constructed and arranged as it rotates to move feed along said passage to be discharged at the distal end of the discharge outlet;
   a shutter constructed and arranged to occlude the passage at the opening and being provided within the discharge outlet, the shutter being coupled to and rotating with the auger, and the shutter having a forward edge and a trailing edge defined in relation to the direction of rotation;
   wherein the enlarged end portion of the discharge outlet having an outer wall spaced laterally by a predetermined distance from the passage such that, as the forward edge progressively occludes the passage as the shutter rotates, any feed between the outer wall and the moving forward edge of the shutter will fall from the enlarged end portion;
   an electric motor; and
   a drive system for coupling the motor to the auger to provide drive thereto, the drive system being arranged in use to cause the electric motor to rotate the auger through a discrete number of completed 360° turns such that when the auger is not rotating the passage is fully occluded by the shutter.

2. A feeder according to claim 1, wherein the passage is generally cylindrical.

3. A feeder according to claim 2, wherein the chamber defines an interior wall, and the passage has essentially the same radius throughout, being the radius of the interior wall of the chamber.

4. A feeder according to claim 3, wherein the shutter comprises a generally cylindrical wall cut away on one side, the interior surface of the cylindrical wall defining part of the passage; the generally cylindrical wall being positioned so that, as the shutter rotates with the auger, alternately feed from the chamber either passes axially from the chamber to the interior of the shutter to discharge from the feeder through the cut away, or the passage is occluded by the cylindrical wall.

5. A feeder according to claim 4, wherein a fixed connecting member with a generally cylindrical inner surface is coupled to the chamber, and defines that portion of the passage immediately upstream of the generally cylindrical wall of the shutter.

6. A feeder according to claim 1, wherein the discharge outlet and the shutter are provided with a resistance mechanism to resist the shutter rotating when the passage is fully occluded by the shutter.

7. A feeder according to claim 6, wherein the resistance mechanism comprises:
   a lug provided on the discharge outlet; and
   a cooperating projection provided on the shutter.

8. A feeder according to claim 1, wherein the enlarged end portion is positioned to restrict access to the interior of the passage from outside the feeder.

9. A feeder according to claim 1, wherein the discharge outlet is provided with a depending wall on one side of the opening therefrom such that, when the passage is fully occluded, the trailing edge of the shutter is adjacent the depending wall, and the depending wall cooperates with the shutter to prevent discharge of feed over the trailing edge when the auger is not rotating and the forward edge is at a height above the trailing edge.

10. A feeder according to claim 1, wherein the forward edge of the shutter is provided with an in-turned lip, discharge of feed from the passage being progressively restricted as the passage is occluded by the forward edge of the shutter up to a position before the passage is fully occluded at which further discharge is prevented by the lip.

11. A feeder for animals selected from domestic pets, cage birds, chickens, fish and wild birds, the feeder comprising:
   a hopper constructed and arranged to hold a supply of dry feed;
   a chamber constructed and arranged to receive feed by gravity from a lower portion of the hopper, the chamber having a discharge outlet at one axial end of the chamber, and a passage being defined from and including the chamber to an opening at a distal end of the discharge outlet for discharge of feed from the feeder;
   an auger mounted for rotation about an axis within said chamber, the auger being constructed and arranged as it rotates to move feed along said passage to be discharged at the distal end of the discharge outlet;
   a shutter constructed and arranged to occlude the passage and being provided within the discharge outlet, the shutter being coupled to and rotating with the auger, and the shutter having a forward edge and a trailing edge defined in relation to the direction of rotation;
   the distal end of the discharge outlet being provided with an enlarged end portion
   wherein the enlarged end portion having an outer wall spaced from the passage such that, as the forward edge progressively occludes the passage as the shutter rotates, any feed between the outer wall and the forward edge of the shutter will fall from the enlarged end portion;
   an electric motor; and
   a drive system for coupling the motor to the auger to provide drive thereto, the drive system being constructed and arranged in use to cause the electric motor to rotate the auger through a discrete number of completed 360° turns such that when the auger is not rotating the passage is fully occluded by the shutter,
   wherein the discharge outlet is provided with a depending wall on one side of the opening therefrom such that, when the passage is fully occluded, the trailing edge of the shutter is adjacent the depending wall, and the depending wall cooperates with the shutter to prevent discharge of feed over the trailing edge when the auger is not rotating and the forward edge is at a height above the trailing edge.

12. A feeder for animals selected from domestic pets, cage birds, chickens, fish and wild birds, the feeder comprising:
   a hopper constructed and arranged to hold a supply of dry feed;
   a chamber constructed and arranged to receive feed by gravity from a lower portion of the hopper, the chamber having a discharge outlet at one axial end of the chamber, and a passage being defined from and including the chamber to an opening at a distal end of the discharge outlet for discharge of feed from the feeder;
   an auger mounted for rotation about an axis within said chamber, the auger being constructed and arranged as it rotates to move feed along said passage to be discharged at the distal end of the discharge outlet;
   a shutter constructed and arranged to occlude the passage and being provided within the discharge outlet, the shutter being coupled to and rotating with the auger, and the shutter having a forward edge and a trailing edge defined in relation to the direction of rotation;
   the distal end of the discharge outlet having an enlarged end portion
   wherein the enlarged end portion having an outer wall spaced from the passage such that, as the forward edge progressively occludes the passage as the shutter rotates, any feed between the outer wall and the forward edge of the shutter will fall from the enlarged end portion;
   an electric motor; and
   a drive system for coupling the motor to the auger to provide drive thereto, the drive system being constructed and arranged in use to cause the electric motor to rotate the auger through a discrete number of completed 360° turns such that when the auger is not rotating the passage is fully occluded by the shutter,
   wherein the forward edge of the shutter is provided with a lip, discharge of feed from the passage being progressively restricted as the passage is occluded by the forward edge of the shutter up to a position before the passage is fully occluded at which further discharge is prevented by the lip.

* * * * *